(12) United States Patent
Boskamp et al.

(10) Patent No.: US 12,347,664 B2
(45) Date of Patent: Jul. 1, 2025

(54) PROCESSING OF SPATIALLY RESOLVED, ION-SPECTROMETRIC MEASUREMENT SIGNAL DATA TO DETERMINE MOLECULAR CONTENT SCORES IN TWO-DIMENSIONAL SAMPLES

(71) Applicant: Bruker Daltonics GmbH & Co. KG, Bremen (DE)

(72) Inventors: Tobias Boskamp, Worpswede (DE); Dennis Trede, Bremen (DE)

( * ) Notice: Subject to any disclaimer, the term of this patent is extended or adjusted under 35 U.S.C. 154(b) by 0 days.

(21) Appl. No.: 18/734,909

(22) Filed: Jun. 5, 2024

(65) Prior Publication Data
US 2024/0321565 A1    Sep. 26, 2024

Related U.S. Application Data

(63) Continuation of application No. 17/237,995, filed on Apr. 22, 2021, now Pat. No. 12,040,169.

(30) Foreign Application Priority Data

Apr. 24, 2020 (DE) .......................... 102020111240.8

(51) Int. Cl.
*H01J 49/00* (2006.01)
*G01N 27/623* (2021.01)
*H01J 49/16* (2006.01)

(52) U.S. Cl.
CPC ........ *H01J 49/0036* (2013.01); *G01N 27/623* (2021.01); *H01J 49/164* (2013.01)

(58) Field of Classification Search
None
See application file for complete search history.

(56) References Cited

U.S. PATENT DOCUMENTS

2022/0280424 A1*    9/2022    Mcdevitt .............. A61K 31/711

\* cited by examiner

*Primary Examiner* — Walter L Lindsay, Jr.
*Assistant Examiner* — Geoffrey T Evans
(74) *Attorney, Agent, or Firm* — Benoit & Cote, Inc.

(57) ABSTRACT

The invention relates to methods for processing ion-spectrometric measurement signal data which are recorded spatially resolved across a two-dimensional sample, comprising: —providing the measurement signal data which have a plurality of measurement signal histograms, where a histogram contains a measurement signal tuple with intensity dimension (J), mass dimension (m), and collision cross-section dimension (σ), or quantities derived therefrom; —specifying first and second selections of ionic species for the sample, whose presence in histograms is detectable and distinguishable using the collision cross-section dimension or proxy; —determining the spatially resolved content of ionic species from the first and second selections in histograms of the finite areas ($A_{fin,x,y}$), and computing the various contents to form spatially resolved content scores ($G_{x,y}$); and—labeling the sample with the content scores ($G_{x,y}$). The invention also relates to methods for acquiring and processing ion-spectrometric measurement signal data, and ion mobility-mass spectrometers.

20 Claims, 7 Drawing Sheets

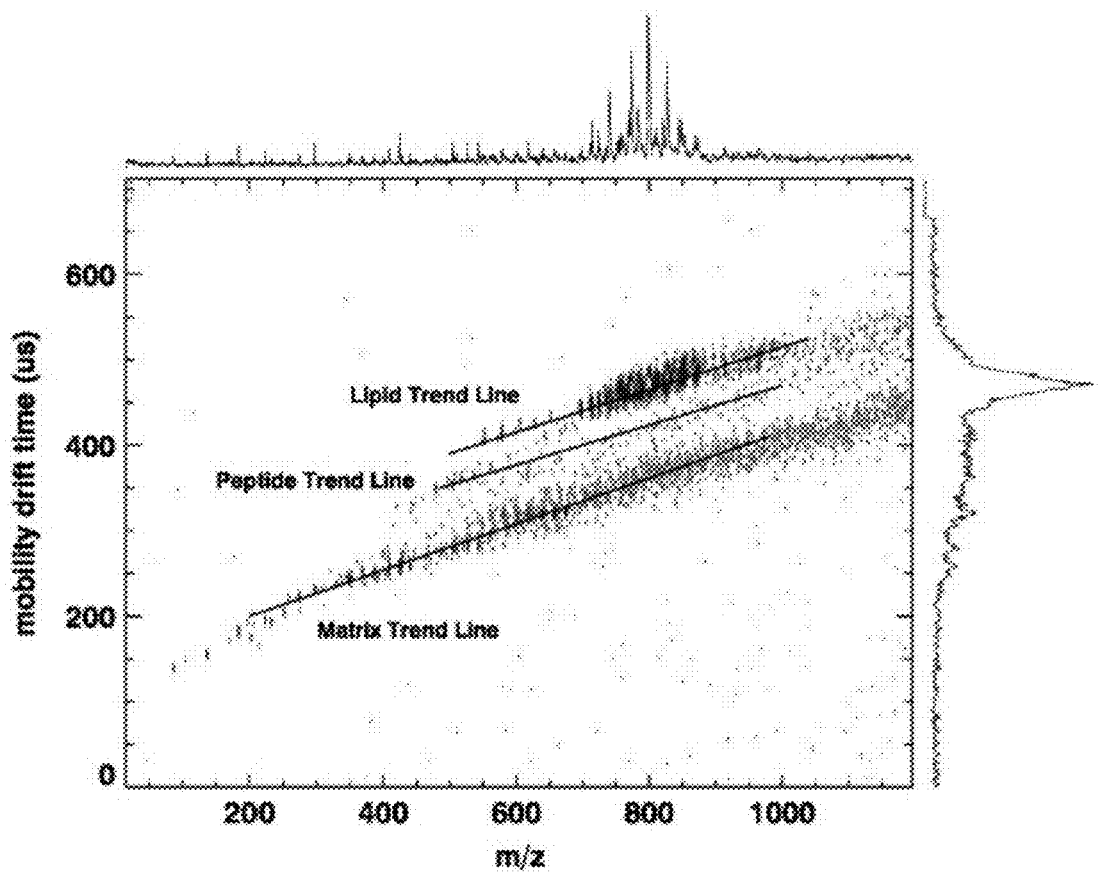

Figure 1.
MALDI-IM 2D plot of a rat brain tissue section with 2,5-dihydroxy benzoic acid (DHB) matrix in positive ion mode. Many of the peaks in the trend line identified as 'matrix' can be assigned to DHB clusters or DHB clusters + potassium. The rectangular region of interest, 16 ms wide (mobility drift time) and 100 amu long (centered at 800 m/z), was defined in software for subsequent use during acquisition of the data in Fig. 2.

FIGURE 1

PROCESSING OF SPATIALLY RESOLVED, ION-SPECTROMETRIC MEASUREMENT SIGNAL DATA TO DETERMINE MOLECULAR CONTENT SCORES IN TWO-DIMENSIONAL SAMPLES

BACKGROUND OF THE INVENTION

Field of the Invention

The invention relates to methods for processing ion-spectrometric measurement signal data recorded spatially resolved across a two-dimensional or flat sample. Ion-spectrometric measurement signal data are particularly those which have been acquired with separation into a collision cross-section dimension ($\sigma$) and a mass dimension (m) which are analytically independent of each other.

Description of the Related Art

The Prior Art is explained below with reference to a specific aspect. This shall not be understood as limiting the scope of the disclosure, however. Useful further developments and modifications of what is known from the Prior Art can also be applied above and beyond the comparatively narrow scope of this introduction, and will easily be evident to the expert skilled in the art in this field after reading the following disclosure.

MALDI Mass Spectrometry

Spatially resolved or imaging MALDI mass spectrometry (MALDI MSI, Matrix Assisted Laser Desorption and Ionization Mass Spectrometry Imaging) is an analytical method used particularly to analyze biological tissue samples. With this method, a continuous tissue sample is usually scanned point by point with a laser and a dataset is created which contains a complete mass spectrum for each measuring point; this mass spectrum can also be computed as a sum spectrum of many single spectra from the same point because the signal-to-noise ratio is then better. It is thus possible to generate spatially resolved molecular profiles of biomolecules such as lipids, peptides, proteins, and glycans directly from tissue sections, see for example U.S. Pat. No. 5,808,300 as an early disclosure of such an imaging method.

To prepare a MALDI MSI measurement, the tissue sample is coated with a special matrix solution. During the measurement, the crystalline matrix clusters absorb the energy of the laser beam and are thus extracted from the tissue. In this process, they also entrain biomolecules from the tissue which have become embedded in the matrix clusters during crystallization. The biomolecules acquire a charge during this process, i.e., they are ionized. The charged molecules thus extracted are subsequently separated according to their mass-to-charge ratio m/z and detected in a mass spectrometer. In addition to the analyte molecules from the tissue, therefore, matrix molecules and matrix clusters are also always detected. It is, however, desirable for the proportion of matrix to be as small as possible, since it is an artifact of the sample preparation and ionization method and contains hardly any analytical information of interest about the sample itself.

The size of the matrix proportion depends on several factors, such as ambient temperature, air pressure and humidity while the matrix is being applied, as well as properties of the sample that is being analyzed. Moreover, many tissue sections have holes of varying sizes, where it is naturally not possible to measure any analyte molecules and the matrix proportion is accordingly high.

Ion Mobility Spectrometry—Mass Spectrometry

In a mass spectrometer, molecules are simply separated according to their mass-to-charge ratio m/z. Many ionization methods, such as MALDI, produce singly charged ions (z=1), so it is possible to simply use the term mass (m). It is therefore not possible, as a rule, to distinguish different molecules of the same or almost the same mass in a mass spectrometer.

In ion mobility spectrometry-mass spectrometry (IMS-MS), the charged molecules pass through an additional stage before reaching the mass spectrometer. In this stage, a gas and an electric field are used to separate the charged molecules according to their collision cross-section ($\sigma$). This means the charged molecules are essentially introduced into the mass spectrometer sorted according to their collision cross-section. The more usual parameter of mobility (K) is often used, which is inversely proportional to the collision cross-section. Instead of a one-dimensional mass spectrum, a two-dimensional collision cross-section-mass signal histogram is obtained for each measuring point, said histogram usually comprising the three dimensions collision cross-section $\sigma$ (or mobility K), mass-to-charge ratio m/z (or simply mass m), and intensity (J). See FIG. 1 from the Prior Art, where the vertical drift time axis (mobility drift time) is proportional to the collision cross-section, and the intensity is plotted on a color scale in the original, and on a gray scale in the image reproduced here.

All charged molecules detected generate signal peaks at specific locations in the histogram according to their masses and collision cross-sections. Mass and collision cross-section roughly correlate with each other—heavier molecules are typically also bigger—but the precise relationship depends on the class of molecule in question. Thus, when viewed across many different biomolecules, it can be the case that a light molecule has a larger collision cross-section than a heavier molecule and vice versa. For the lipid class of molecules, which is important in a great many applications, and others also, it can be assumed that they follow a specific curve in a collision cross-section/mass plot, as expressed in the trend lines in FIG. 1, for example.

The paper by Kamila Chughtai et al. (Journal of Lipid Research Volume 54, 2013 333-344) describes the discovery, identification, and spatially resolved visualization of several lipid species in a xeno-transplantation model of a human breast tumor using MALDI-IMS-MSI.

At the Imaging Mass Spectrometry Conference (OurCon VII), which was held from October 28 to 31, 2019 in the Palais du Grand Large in Saint-Malo, France, a method for the visualization and quantification of various relative signal contributions was presented. This method is based on mass defect filtering, i.e., on statistical models for the expected masses of peptides, glycans, and matrix clusters (not including the collision cross-section, which was not contained in the data). By comparing the molecular background signal of a pure mass spectrum with these models, local mass shifts are estimated with high accuracy, and each spectrum is broken down into signal components, which can be assigned to the different classes of molecule. For each pure mass spectrum, a signal quality score (SQS) from 0% to 100% is calculated, which represents the relative contribution of peptide/glycan molecules above the matrix background. The visualization of these scores makes it possible to identify regions with low signal quality and to assess the overall data quality and homogeneity.

There is a need to enable quantitative assessment of the spatial distribution of selected molecules of interest as distinct from other mass signals, especially background measurement signals, across an analyzed two-dimensional or flat sample, said assessments being based on ion mobility spectrometry-mass spectrometry data obtained therefrom. Further objectives that can be achieved by the invention will be immediately clear to the person skilled in the art from reading the disclosure below.

SUMMARY OF THE INVENTION

The invention relates to methods for processing ion-spectrometric measurement signal data recorded spatially resolved across a two-dimensional sample. It is preferable to use a wide two-dimensional sample, e.g., a flat tissue section, or an array of separately prepared samples, e.g., locally applied tissue homogenate preparations. This two-dimensional sample can have been prepared with a matrix substance for matrix-assisted laser desorption (especially across the whole surface). Worthy of particular mention is the MALDI process, in which desorption and ionization are effected by the same laser shot. It is also possible, however, to initiate the desorption with a first laser shot, and to then post-ionize the desorbed molecules by means of a second laser shot which is temporally coordinated with the first. Embodiments without matrix preparation for generating measurement signal data that are evaluated with the proposed methods are also considered, for example measurement signal data generated by means of SIMS (Secondary Ion Mass Spectrometry) by bombarding the sample with primary ions, or by means of DESI (Desorption Electro-Spray Ionization) by exposing the sample to a solvent which is sprayed while a voltage gradient is applied.

Measurement signal data are provided which have a plurality of measurement signal histograms. A measurement signal histogram is assigned, by means of two location coordinates (x, y), to a finite area ($A_{fin,x,y}$) of the two-dimensional sample, which is smaller than a total area ($A_{total}$) of the two-dimensional sample, and contains a measurement signal tuple having intensity dimension (J) or a quantity derived therefrom, mass dimension (m) or a quantity derived therefrom, and collision cross-section dimension ($\sigma$), or a quantity derived therefrom. The two location coordinates (x, y) in the measurement signal histograms can be supplemented with a depth dimension (t) to form a coordinate triple (x, y, t), for example when a desorbing beam probes different depths of the two-dimensional sample in sequence, in several ablation layers, for measurement signal content. The measurement signal tuple can furthermore (i) be supplemented by a charge dimension (z) or a quantity derived therefrom (e.g., m/z), and/or include a mobility dimension (K), with the latter being derived from the collision cross-section ($\sigma$). For the sake of clarity, it should be emphasized here that, in the context of the present disclosure, the raw data on which the above-mentioned physical parameters are based can also be regarded as derived quantities, for example times of flight from a time-of-flight mass spectrometer, and voltage amplitudes from an ion detector, since they are representative quantities for the physical parameters which cannot be observed directly (e.g., time of flight=>mass m or m/z; voltage=>intensity J) and can usually be converted into such by precisely specified rules of calculation.

Furthermore, a first selection and second selection of ionic species are specified for a two-dimensional sample, whose presence in measurement signal histograms is detectable, and which can be distinguished using the collision cross-section dimension ($\sigma$) or the quantity derived therefrom (e.g., mobility K). Where necessary, areas to be selected can be defined manually in a computer-generated graphic representation of the measurement signal histogram. It is most preferable for the first selection of ionic species to comprise species of high analytical interest, and for the second selection of ionic species to comprise those of low analytical interest. The first selection of ionic species can include, for example, proteins, peptides, glycans, and/or lipids in the two-dimensional sample. The second selection of ionic species can particularly include charged atoms or molecules and/or clusters thereof, which are generated by the method of sample preparation and/or the method of ionization. It is in principle also possible to specify different biomolecules in the two-dimensional sample relative to each other as the first selection and the second selection. It is thus possible to compare the measurement signals of lipids, glycans, and/or peptides/proteins with each other, or to consider them as a ratio of one to the other, for example. It is furthermore conceivable to use different charge states (z) of classes of molecule and/or within a single class of molecule for the first and second selection of ionic species.

The first selection of ionic species can be specified by summing several measurement signal histograms into an aggregated measurement signal histogram, and identifying an interesting (and possibly dominant) portion of the measurement signal tuple entries in the aggregated measurement signal histogram. This can be done by means of regression analysis, for example by means of logarithmic regression or logarithmic Radon transform. The interesting portion of the measurement signal tuple entries can be used to distinguish the first selection of ionic species from the second selection in at least one dimension of the measurement signal histograms. For example, it is possible to identify disjunct regions in a collision cross-section-mass plane (or a plane with correspondingly derived quantities) of the aggregated histogram which predominantly have a measurement signal content of different origin, for example a lipid and/or peptide region, on the one hand, and a matrix background region, on the other hand.

The regression analysis can be designed such that it searches for a correlation between collision cross-section ($\sigma$) and mass (m) of a molecule according to the equation $\sigma(m) \approx m^k$ (power law), where C is a molecule-dependent proportionality factor and k is a molecule-dependent exponent. This correlation between collision cross-section ($\sigma$) and mass (m) can easily be transferred to quantities derived therefrom. The constants C (proportionality factor) and k (exponent) are dependent on the class of molecule and also the instrument and acquisition parameters. It may be possible to apply an independent power law in each case to many different classes of molecule (e.g., lipids, peptides, glycans). Zhiwei Zhou et al. described this correlation for lipids ("*LipidCCS: Prediction of Collision Cross-Section Values for Lipids with High Precision To Support Ion Mobility—Mass Spectrometry-Based Lipidomics*". Analytical Chemistry, 2017, 89 (17): 9559-9566).

It is possible to compute the aggregated measurement signal histogram by location-independent summation of several measurement signal histograms. Furthermore, the location-independent summation can solely take account of measurement signal histograms where the measurement signal tuple entries of at least one dimension (i) exceed a predetermined threshold value, (ii) are below a predetermined threshold value, or (iii) are within a predetermined value range. For example, a minimum intensity, or alternatively a maximum intensity or an intensity range may be specified. In general, it is also possible to select intensity, collision cross-section, and/or mass ranges (or ranges of correspondingly derived quantities) for preferable consideration. In this way, it is possible to mask out mass signal portions which were found to provide little information from the start or are to be considered as uninformative.

The method can also be designed for at least one measurement signal tuple entry of the individual measurement signal histograms, e.g., in the intensity dimension (J), to be transformed before the summation such that measurement signal tuple entries of a first predetermined range are weighted disproportionately with respect to a second predetermined range.

The spatially resolved content of ionic species from the first selection and the spatially resolved content of ionic species from the second selection are determined in measurement signal histograms of the finite areas ($A_{fin,x,y}$), and the various contents are computed to give spatially resolved content scores ($G_{x,y}$). The spatially resolved content score ($G_{x,y}$) can be computed in an example as $$G_{x,y} = \frac{\sum_{i \in S} J_i}{\sum_{i \in S} J_i + \sum_{i \notin S} J_i},$$

where S designates the quantity of those indices i for which the corresponding measurement signal tuple entries (e.g., $m_i$, $\sigma_i$ or quantities derived therefrom) of the individual measurement signal histogram lie within a predetermined range ("signal corridor") around a selected signal portion (e.g., selected because it is of interest). In this example, the measurement signals from the signal corridor or range are therefore ratioed to all measurement signals (lying inside and outside the corridor or range). This method of computation has proved to be particularly stable in data processing terms. The second selection of ionic species (e.g., a signal portion of no interest) contains all the measurement signals which do not lie within the preferred signal corridor or range, which in this embodiment in turn determines the measurement signals of the ionic species of the first selection.

In further embodiments, however, a method of computation is also possible whereby the first and second selection of ionic species are ratioed directly e.g., as per the following equation:

$$G_{x,y} = \frac{\sum_{i \in S} J_i}{\sum_{i \notin S} J_i}.$$

This computation method provides a content score that represents the actual content ratios of each individually selected ionic species and is therefore easier to interpret.

It is, furthermore, conceivable and intended to define the second selection of ionic species such that it does not include all the ionic species that were not assigned to the first selection of ionic species. For example, a second signal corridor or range can be determined for a specific second signal portion in a collision cross-section-mass plane (or in a plane of correspondingly derived quantities). This approach can be useful in the case where a measurement signal histogram contains signal portions of several different substance classes, e.g., lipids and/or peptides, and/or glycans, which as biomolecules are in principle candidates for the signal portion of interest, as well as matrix clusters or other background ion species, which are essentially never of interest. The content score can be computed as before with:

$$G_{x,y} = \frac{\sum_{i \in S_a} J_i}{\sum_{i \in S_a} J_i + \sum_{i \in S_b} J_i} \text{ or } G_{x,y} = \frac{\sum_{i \in S_a} J_i}{\sum_{i \in S_b} J_i},$$

where $S_a$ and $S_b$ respectively designate the quantity of those indices i for which the corresponding measurement signal tuple entries (e.g., $m_i$, $\sigma_i$ or quantities derived therefrom) of the individual measurement signal histogram were assigned to the first or second selection of ionic species respectively. Furthermore, the second computation method above has the advantage that the content score can easily be inverted, thereby producing an informative result, for example when the first and second selection of ionic species comprise different biomolecules in the flat sample and their ratio is calculated.

Finally, the two-dimensional or flat sample is labeled with the spatially resolved content scores ($G_{x,y}$). After labeling, a user can be presented with an image of the two-dimensional or flat sample in which individual finite areas ($A_{fin,x,y}$) are visibly coded with the assigned content score ($G_{x,y}$), e.g., on a color scale or a gray scale. It is possible to classify predetermined value ranges of the content score as ion-spectrometric measurement signals from outside the two-dimensional sample, of which it can be justifiably assumed that they do not contain any information of analytical use, e.g., at locations where a tissue section is interrupted or has holes, or in the regions between separate samples applied to a sample support. In addition, or alternatively, a subsequent evaluation (i) can take account of only measurement signal histograms from finite areas ($A_{fin,x,y}$) where the content scores ($G_{x,y}$) lie in a predetermined range of values, e.g., above a minimum value, below a maximum value, or within a value range, and/or (ii) uses the content scores ($G_{x,y}$) as weighting factors. The weighting factors can be used for adaptive noise suppression in a subsequent data analysis, for example.

The invention relates, furthermore, to a method for acquiring and processing ion-spectrometric measurement signal data, where (i) the ion-spectrometric measurement signal data have been acquired with the aid of an ion mobility spectrometer-mass spectrometer, and (ii) a method as explained above is performed to process the data acquired.

The disclosure furthermore includes an ion-mobility spectrometer-mass spectrometer having a computing and/or control unit which is designed and configured to execute one of the methods explained above.

BRIEF DESCRIPTION OF THE DRAWINGS

The invention can be better understood by referring to the following illustrations. The elements in the illustrations are not necessarily to scale, but are primarily intended to illustrate the principles of the invention (mostly schematically).

FIG. 1 depicts a collision cross-section-mass signal histogram with highlighted trend lines for classes of molecule from the Prior Art paper of Shelley N. Jackson et al. (J. Mass Spectrom. 2007 August; 42(8); 1093-1098; FIG. 1 with caption there).

2019, 91, 22, 14552-14560; FIG. 1 there), with which collision cross-section-mass signal histograms (e.g., location coordinates x, y; signal tuple m, σ, J), can be acquired. The special method of mobility separation (parallel accumulation trapped ion mobility spectrometry—PATIMS) is described in more detail in the published patent applications EP 3 054 473 A1 or US 2016/0231275 A1 of the applicant, for example.

DETAILED DESCRIPTION

While the invention has been illustrated and explained with reference to a number of embodiments, those skilled in the art will recognize that various changes in form and detail can be made without departing from the scope of the technical teaching, as defined in the attached claims.

Hereinafter, a method for assessing spatially resolved ion mobility spectrometry-mass spectrometry data is described which provides a score or quantifier for every area indicating approximately what percentage of the spectra measured there originates from species of analytical interest from the sample. A high value for this quantifier means a high proportion of molecules of the species of interest ionized from the sample and thus a high information content and a high signal quality. Low values, in contrast, can indicate that the measured spectra are dominated by a background signal, which can be traced back to the method of sample preparation and/or the method of ionization, for example.

Figure 2:
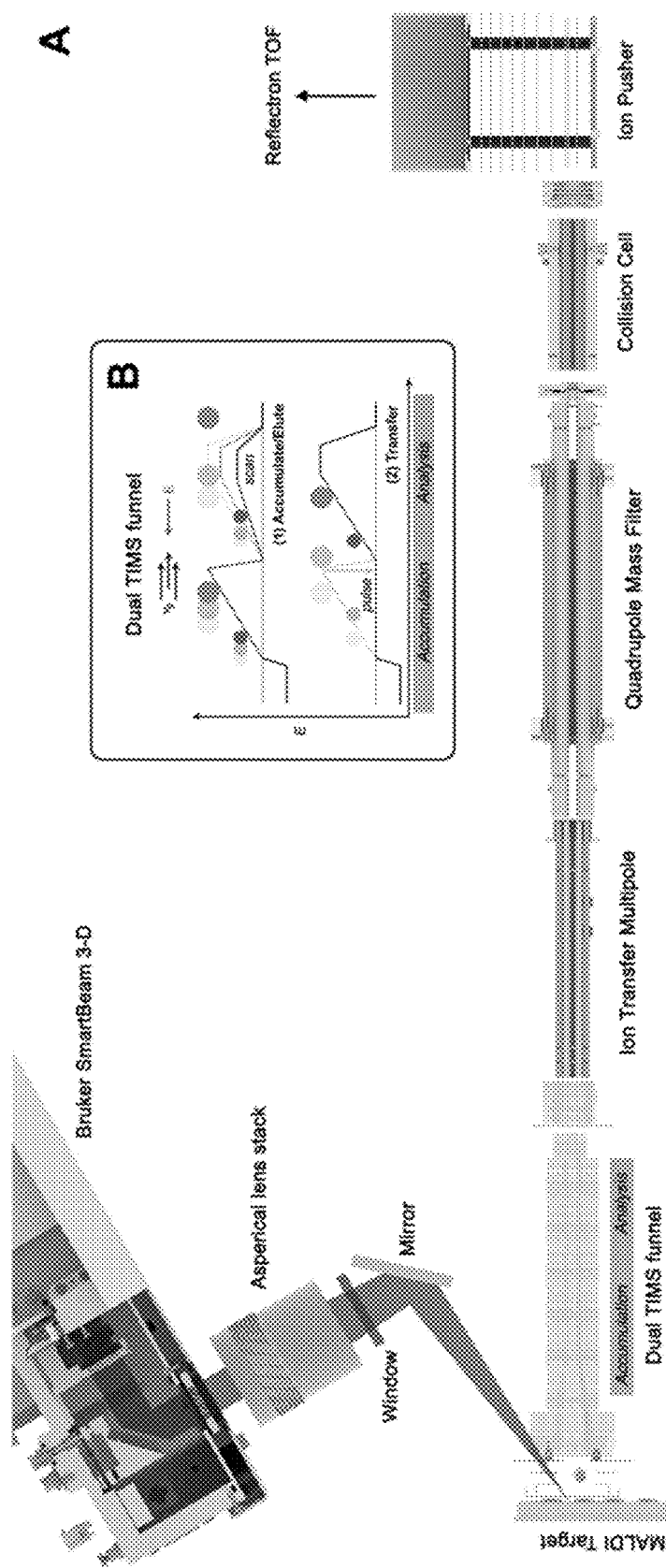
FIG. 2 depicts an adapted schematic representation of an ion mobility spectrometer—mass spectrometer from the Prior Art paper by Jeffrey Spraggins et al. (Anal. Chem.
Figure 3:
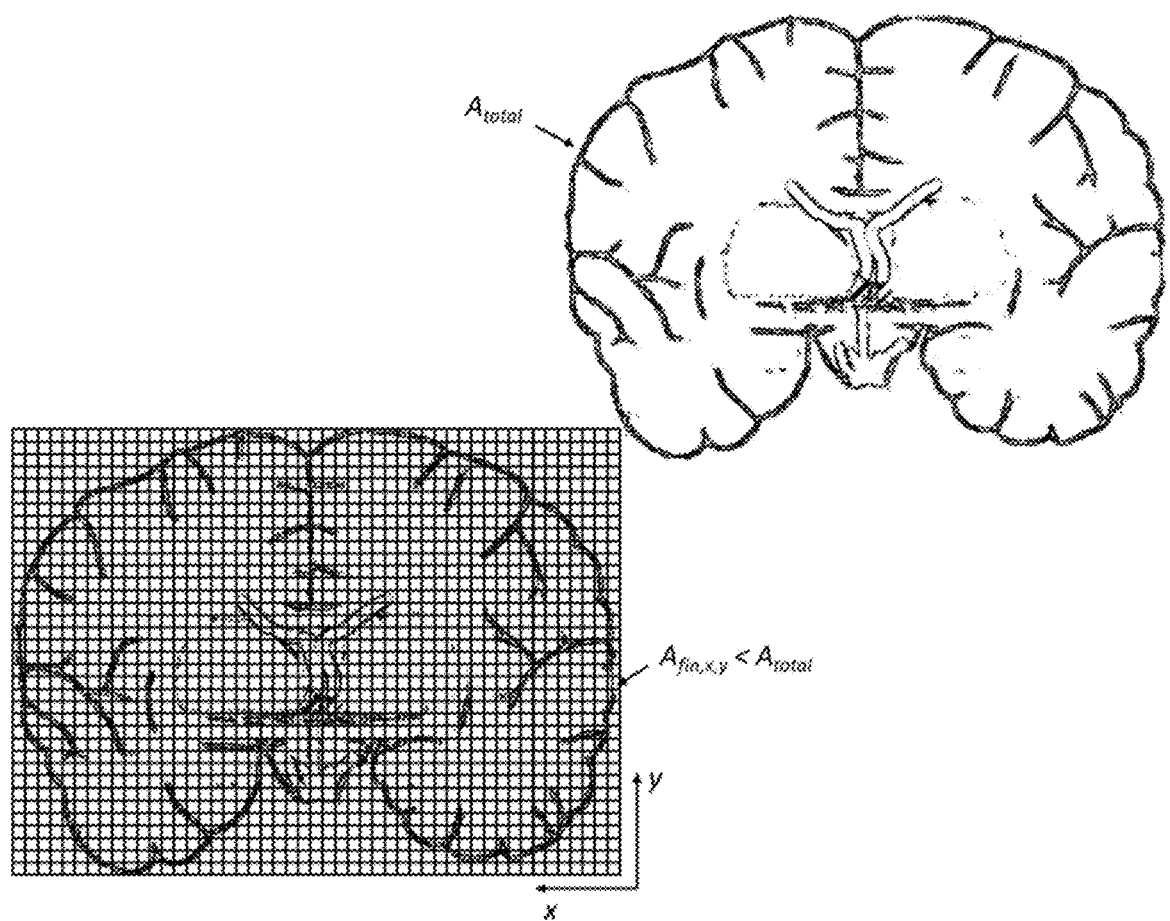
FIG. 3 shows the schematic representation of an example of a flat sample in the form of a tissue section for illustrative purposes, which here imitates the thin section of a mouse brain, once with (bottom left) and once without (top right) square grid for the points or pixels of an ion-spectrometric image.
Figure 4:
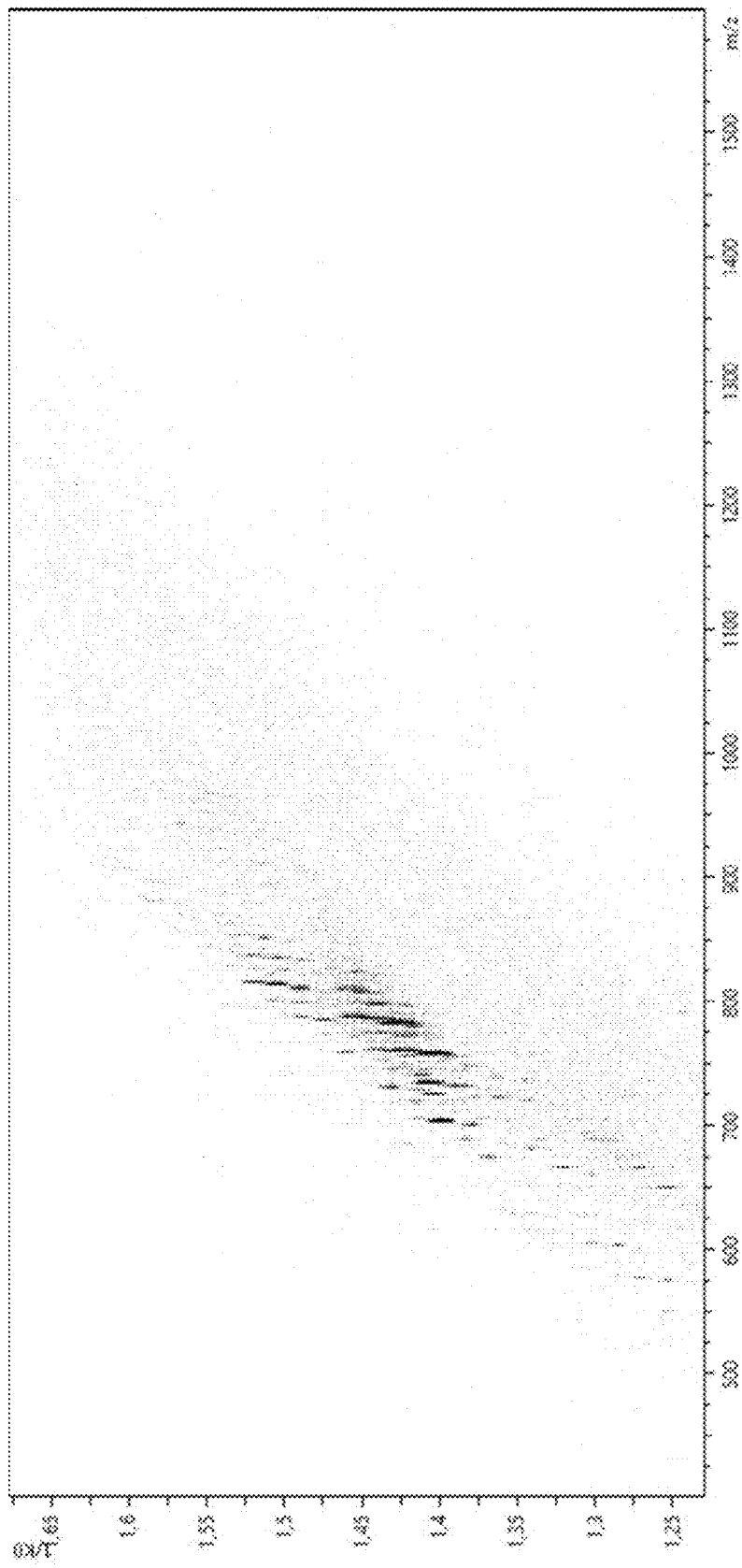
FIG. 4 shows an example of a collision cross-section-mass signal histogram of a MALDI IMS-MSI measurement. The mass (or more precisely the mass-to-charge ratio, designated by m/z) is plotted on the horizontal axis; the collision cross-section (expressed by the derived quantity $1/K_0$) is plotted on the vertical axis.

FIG. 2 is a schematic representation of a possible ion mobility spectrometer-mass spectrometer with which collision cross-section-mass signal histograms from a two-dimensional or flat tissue sample can be acquired with spatial resolution, see setup in Part A. The setup and operation shall be explained here very briefly:

A laser system (Bruker SmartBeam 3-D, top left) with various optical components is designed to bombard a flat sample on a sample support with pulses. The sample support can be scanned step-by-step to obtain spatially resolved measurement signals from the flat sample, e.g., a wide two-dimensional sample such as a flat tissue section or an array of separately prepared samples such as locally applied tissue homogenate preparations.

Once generated, the ions enter the ion mobility spectrometer (dual TIMS cell), which has an accumulating section and an analyzing section. An inert gas flows through both sections of the dual TIMS cell (from left to right in the illustration). In the cell, the gas flow drives the ions against an opposing electric field, see Detail B in the center for the illustrated principle. In the analyzing section, the ions are separated according to their mobility at different positions along the axis.

An incremental decrease in the electric field strength in the analyzing section of the dual TIMS cell allows a sequential release of the ions separated according to their mobility (Detail B, Scan). After the mobility analysis in the analyzing section, the ions which have meanwhile collected in the accumulating section are transferred to the analyzing section (Detail B, Pulse). The ions exiting the analyzing section initially pass through an ion transfer multipole and then enter a quadrupole mass filter. Here, ions can be selected for further analysis, while other ions can be removed. The ions are subsequently transferred into a collision cell, where the ions selected are fragmented by accelerated injection into a neutral gas.

The ions and/or any fragment ions produced therefrom are stored temporarily in the collision cell, before being introduced into the ion pulser of a time-of-flight analyzer with orthogonal injection, temporally coordinated. There they are accelerated perpendicular to the direction of injection onto the flight path of the reflector time-of-flight analyzer. At the end of the flight path, a detector (not shown) receives the different ion packets with temporal and hence mass resolution, and outputs them as a time-of-flight transient, which can subsequently be rescaled into masses (m) or mass/charge ratios (m/z).

Above, a so-called trapped ion mobility spectrometer (TIMS) coupled to a time-of-flight mass analyzer was described with reference to FIG. 2. It shall be understood that other embodiments of mobility spectrometers and mass analyzers can be used for the purpose of generating collision cross-section-mass signal histograms, for example a drift tube ion mobility spectrometer, in which the neutral gas is at rest or flows in the opposite direction to the ion motion, and an electric drawing field is used and which is coupled with a cyclotron resonance cell, for example.

Description of an Exemplary Method

The method described here is suitable to be applied to IMS data acquired in connection with a MALDI MSI ion source (MALDI IMS-MSI). In a preferred embodiment, the method comprises at least the following steps:

1. Calculating an aggregated collision cross-section-mass signal histogram which collates the information on the individual measuring points of the flat sample from several (preferably all) histograms.
2. Determining a signal portion of interest (first selection of ionic species), for example by means of regression analysis to determine the correlation between collision cross-section and mass for the dominant signal portion of the complete measurement.
3. Specifying a section of the collision cross-section-mass plane (σ-m plane or a plane of quantities derived therefrom), which contains the dominant and interesting signal portion of the measurement ("signal corridor"), if applicable accompanied by specification of a second section of the collision cross-section-mass plane with a further signal portion which is of lesser interest, for example.
4. Calculating a content score, which can be termed a signal quality score, for individual measuring points of the two-dimensional or flat sample by comparing the signal portions within and outside of the signal corridor or within the two previously defined (preferably disjunct) sections (e.g., covering different charge states (z) of molecules and/or classes of molecules).
5. Evaluating of the content score for the subsequent analytical steps. Hereinafter, these steps are described in more detail.

Aggregation of the Collision Cross-Section-Mass Signal Histograms

In the first step, an aggregated collision cross-section-mass signal histogram which collates the information on the individual measuring points from preferably all histograms can be formed. To shorten the computing time, it is also possible to use a representative selection of the histograms to form the aggregated collision cross-section-mass signal histogram, where necessary. The aggregation can, for example, be carried out by simple sum formation, i.e., the individual histograms are summed in terms of intensity (J) to form a sum histogram. More complex aggregations are also conceivable, however, e.g., such that in each histogram that is included, only dominant signal portions above a specific threshold value of the intensity ($J_{min}$) are considered. The signal intensities of the individual histograms could also be modified by a transform before the sum is formed, e.g., to place greater or less emphasis on the portions with a strong signal compared to those with a weaker signal, depending on the objective of the evaluation.

Regression Analysis

It is assumed that the correlation between collision cross-section σ and mass m for the signal portion of interest (for example the dominant one) of the complete measurement (or the correlation for correspondingly derived quantities) is approximately described by a power law with parameters C and k, as explained above. These parameters can be estimated on the basis of the aggregated histogram by using a suitable regression analysis. The aggregated histogram is composed of a number of individual signals, with each individual signal corresponding to a tuple (e.g., $m_i$, $\sigma_i$, $J_i$), where $m_i$ designates the respective mass (possibly also $(m/z)_i$, mass-to-charge ratio), $\sigma_i$ the collision cross-section (possibly also a derived mobility quantity $K_i$) and $J_i$ the measured signal intensity. Several methods are possible for the actual regression analysis, including the following in particular:

Simple Logarithmic Regression

By taking the logarithm of the power law shown above, a linear relationship is obtained so that the measurements are described by the model equation $$\log(\sigma_i) = k \log(m_i) + \log(C) + \varepsilon_i.$$

Here $\varepsilon_i$ designates the deviations from the model, which are assumed to be randomly distributed. By means of simple linear regression, the constants C and k can be determined via $$k = \frac{M_{00}M_{11} - M_{10}M_{01}}{M_{00}M_{20} - (M_{10})^2}$$

and $$\log(C) = \frac{1}{M_{00}}(M_{01} - kM_{10})$$

with $$M_{\mu\nu} = \sum_i J_i (\log m_i)^\mu (\log \sigma_i)^\nu, \quad \mu, \nu \in \{0, 1, 2\}$$

The above equations can easily be adapted for quantities derived from the collision cross-section (σ) and mass (m).

Robust Logarithmic Regression

A known disadvantage of the simple logarithmic regression described above is the sensitivity to outlier values in the measured data. Alternatively, more robust regression methods can be used to estimate the parameters k and log(C) of the linear model equation. Two possible methods in particular can be used, namely (i) the Lasso regression (Tibshirani, Robert (1996). "*Regression Shrinkage and Selection via the lasso*". Journal of the Royal Statistical Society. Series B (methodological). Wiley. 58 (1): 267-88) and/or (ii) the Theil-Sen estimator (see Sen, Pranab Kumar (1968), "*Estimates of the regression coefficient based on Kendall's tau*", Journal of the American Statistical Association, 63 (324): 1379-1389).

Logarithmic Radon Transform

Figure 5:
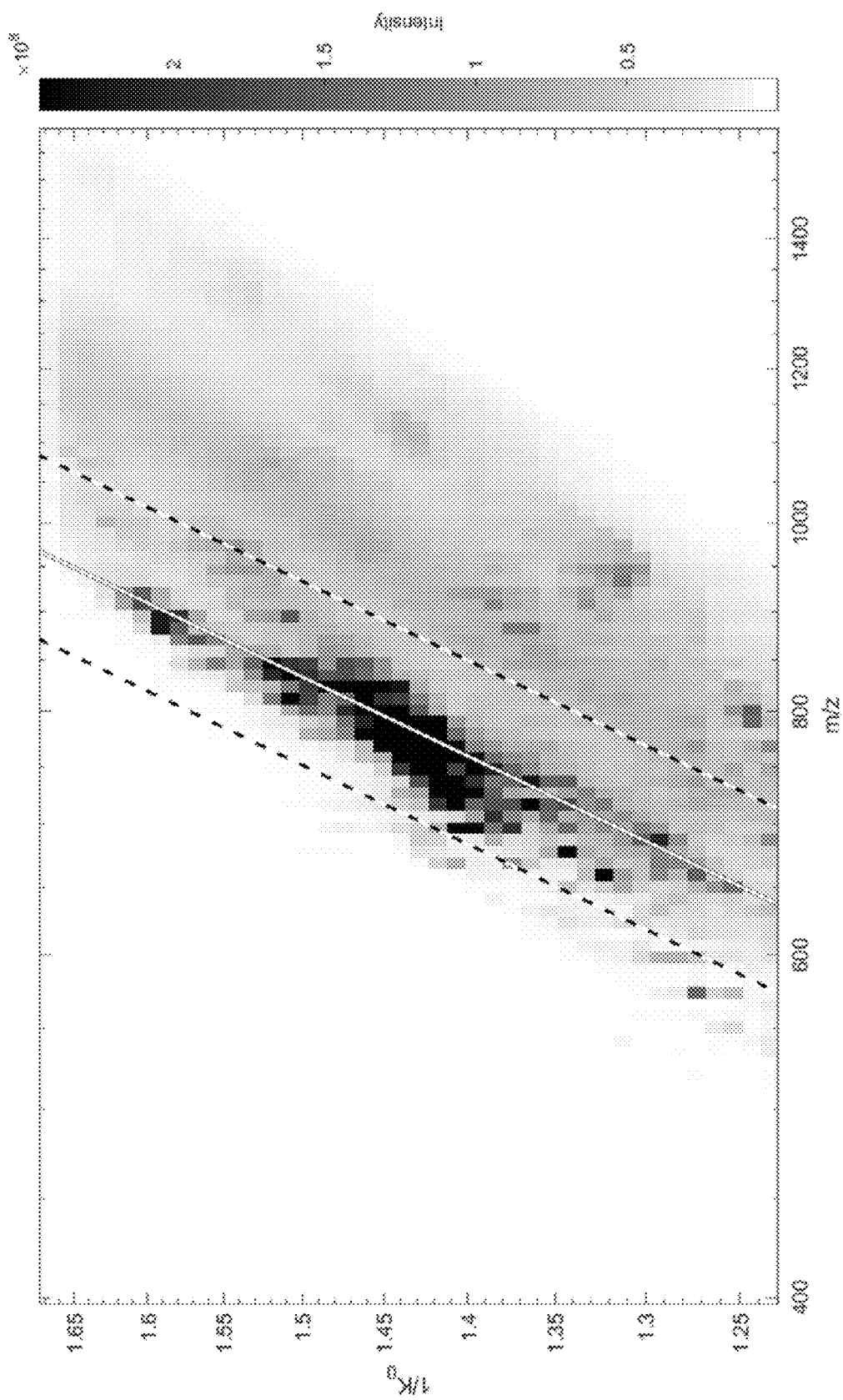
FIG. 5 is a logarithmic depiction of an aggregated collision cross-section-mass signal histogram which shows the regression line (solid white line) and a signal corridor (dashed line) for the dominant signal component, which is of interest.
Figure 6:
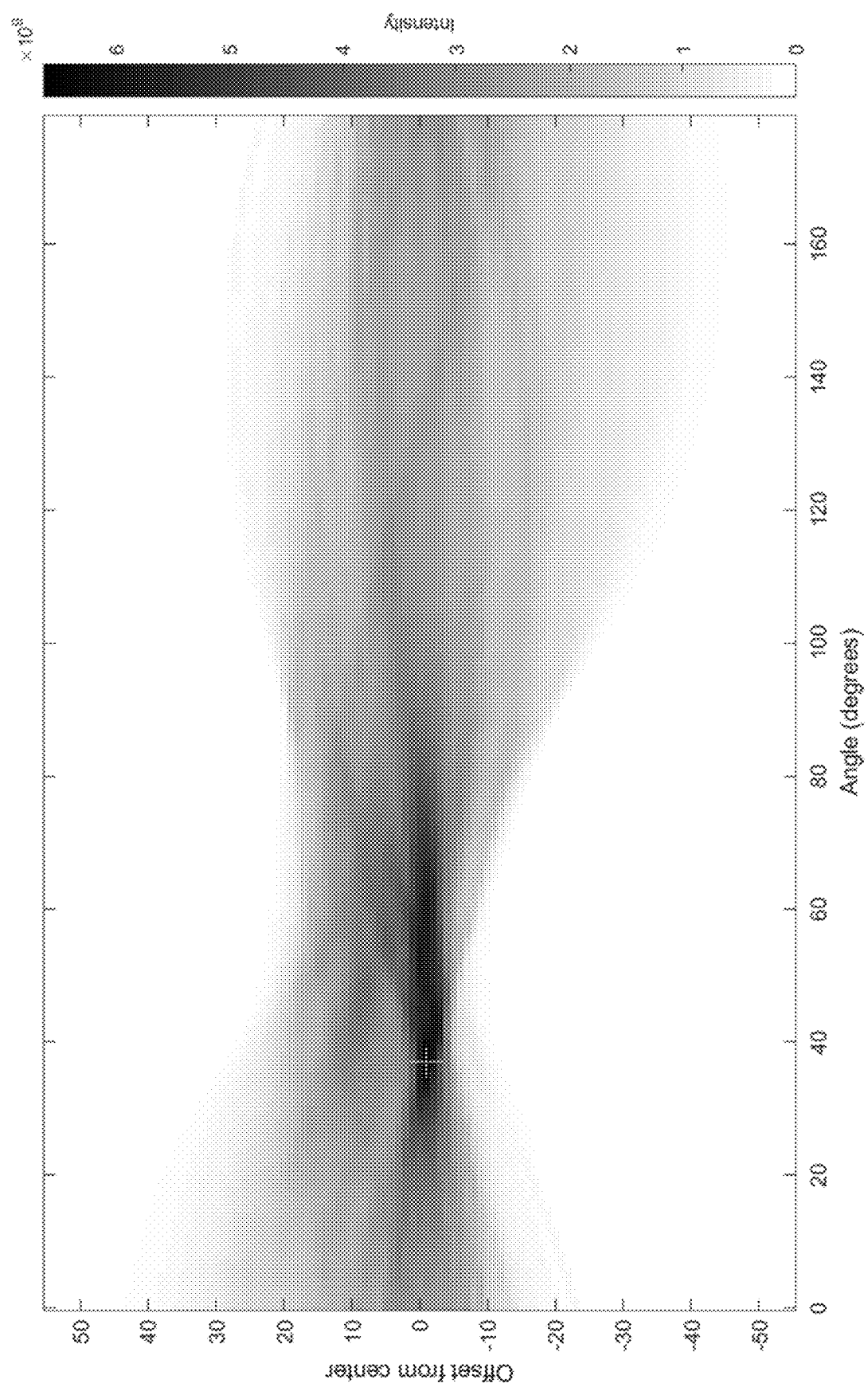
FIG. 6 depicts the Radon transform of the logarithmic collision cross-section-mass signal histogram from FIG. 5. The projection angle is plotted on the horizontal axis, the distance from the center of the logarithmic histogram is plotted on the vertical axis. The white cross identifies the position with maximum intensity.

A further possibility for the regression analysis is to apply the Radon transform to a 2D histogram of the measured intensities in the logarithmic σ-m plane (see Radon, Johann (1917), "Über die Bestimmung von Funktionen durch ihre Integralwerte längs gewisser Mannigfaltigkeiten", Berichte über die Verhandlungen der Königlich-Sächsischen Akademie der Wissenschaften zu Leipzig, Mathematisch-Physische Klasse, Leipzig: Teubner (69): 262-277). To this end, the range of values covered by the logarithmic measurement values (log $m_i$, log $\sigma_i$) is subdivided into rectangular subsections of equal size. For each subsection, those intensities $J_i$ whose associated measured values (log $m_i$, log $\sigma_i$) fall into this subsection are summed (see FIG. 5). The Radon transform is applied to the resulting 2D histogram and the position with maximum intensity is sought within it (see white cross in FIG. 6). The inverse transform of this position gives the required straight line in the logarithmic σ-m plane (see FIG. 5). The parameters of this straight line—the gradient k and the y-intercept log(C)—finally describe the required correlation between collision cross-section σ and mass m according to the power law in the form of a curve which represents the profile of the dominant and interesting signal portion in the aggregated collision cross-section-mass signal histogram. Here also, the method can be adapted to quantities derived from the collision cross-section (σ) and mass (m).

Specifying a Corridor or Region of Signal Portions

After the proportionality factor C and the exponent k of the power law have been determined, factors $C_{lo}$<C and $C_{hi}$>C can be set (lo stands for low; hi for high). With these values in place of C in the power law, the result is shifted curves, which specify the boundaries of the signal corridor (see FIG. 5). By suitably selecting $C_{lo}$ and $C_{hi}$, these curves enclose the dominant signal portion. By selecting $C_{lo}$=0, the signal corridor can be extended downward and to the right as far as the boundaries of the histogram so that the corridor is actually only bounded at the top. Alternatively, the signal corridor can be extended to the top left by $C_{hi}$=∞ (infinite). What constitutes a suitable selection of $C_{lo}$ and $C_{hi}$ depends on the class of molecule under analysis. Typical values for lipids and glycans are $C_{lo}=0.90$ C ... 0.96 C and $C_{hi}=1.04$ C ... 1.10 C, for example. In an alternative embodiment, a similar method can be used to determine a second section of the collision cross-section—mass plane (second selection), which should not contain all the measurement signals outside the previously determined signal corridor or range but only specific ionic species, especially those of species of no interest, such as MALDI matrix clusters or similar background. Here also, the method can be adapted to quantities derived from the collision cross-section (σ) and mass (m).

Calculation of the Content Scores ("Signal Quality Scores")

The content scores for each individual measuring point are computed with the aid of the corresponding collision cross-section-mass signal histogram. The relevant tuple entries for an individual measuring point or an individual histogram are designated, as above, by $(m_i, \sigma_i, J_i)$, for example. S designates the quantity of those indices i, for which the corresponding measurement values $(m_i, \sigma_i)$ lie within the signal corridor or range. The content score G can then be calculated for the histogram under consideration using $$G = \frac{\sum_{i \in S} J_i}{\sum_{i \in S} J_i + \sum_{i \notin S} J_i}.$$

In this example, the measurement signals from the signal corridor or range are therefore ratioed with all measurement signals (lying within and outside of the corridor or range). This method of computation has proved to be particularly stable in data processing terms. The second selection of ionic species (e.g., the signal portion of no interest) comprises all the measurement signals that do not lie in the preferred signal corridor or range, which in this embodiment in turn determines the measurement signals of the ionic species of the first selection.

In further embodiments, however, a method of computation is also possible whereby the first and second selection of ionic species are ratioed directly e.g., as per the following equation:

$$G_{x,y} = \frac{\sum_{i \in S} J_i}{\sum_{i \notin S} J_i}.$$

This computation method provides a content score that represents the actual content ratios of each individually selected ionic species and is therefore easier to interpret.

It is, furthermore, conceivable and intended to define the second selection of ionic species such that it does not include all the ionic species that were not assigned to the first selection of ionic species. For example, a second signal corridor or range can be determined for a specific second signal portion in a collision cross-section-mass plane (or in a plane of correspondingly derived quantities). This approach can be useful when a measurement signal histogram contains signal portions of several different substance classes, e.g., lipids, glycans, and peptides, which as biomolecules are in principle candidates for a signal portion of interest, as well as matrix clusters or other background ion species which are essentially never of interest. The content score can be computed as before with:

$$G_{x,y} = \frac{\sum_{i \in S_a} J_i}{\sum_{i \in S_a} J_i + \sum_{i \in S_b} J_i} \text{ or } G_{x,y} = \frac{\sum_{i \in S_a} J_i}{\sum_{i \in S_b} J_i},$$

where Su and St respectively designate the quantity of those indices i for which the corresponding measurement signal tuple entries (e.g., $m_i$, $\sigma_i$ or quantities derived therefrom) of the individual measurement signal histogram were assigned to the first or second selection of ionic species respectively. Furthermore, the second computation method above has the advantage that the content score can easily be inverted, thereby producing an informative result, for example when the first and second selections of ionic species comprise different biomolecules from the two-dimensional or flat sample and ratio them to each other.

Evaluation of the Content Scores ("Signal Quality Scores")

Figure 7:
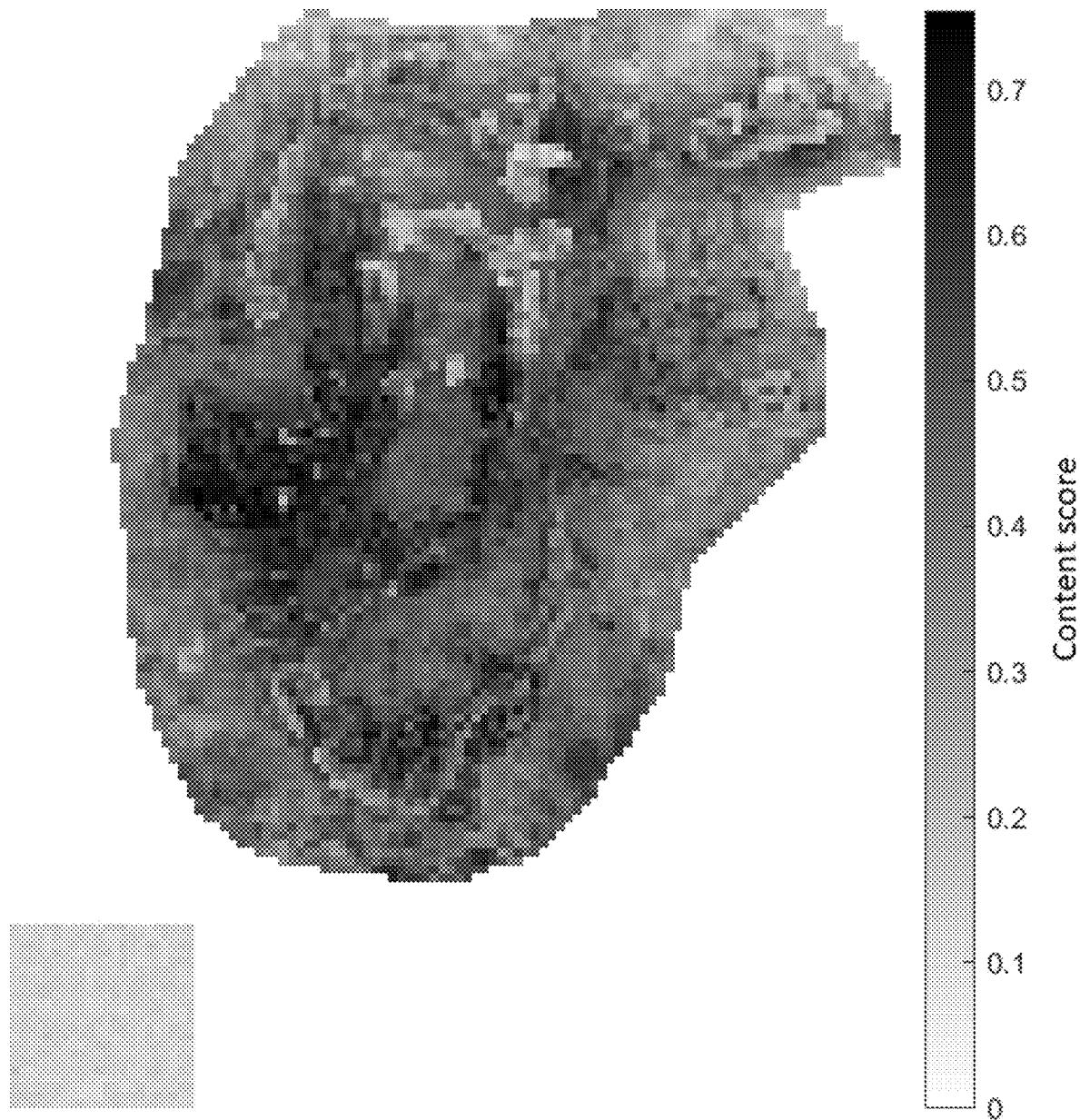
FIG. 7 shows the spatial distribution of a content score for a MALDI IMS-MSI lipid measurement. In the control area outside of the tissue sample (square field bottom left), the scores determined are significantly lower than in the tissue itself. The dark regions within the sample correspond to the denser tissue zones with a higher portion of lipid signals relative to the matrix background.

The content scores can be evaluated by visualizing the spatial distribution of the spatially resolved content scores as a gray scale or false-color image (see FIG. 7). As an alternative, the content scores can be used to control a subsequent analysis of the data. For example, it is possible to use only those measuring points and histograms for the analysis whose content scores are above a specific threshold value, below a specific maximum value, or within a specific value range. The content score could also be used as a weighting factor so that those measurement data with a higher content score (and thus presumably of better quality) receive a higher weighting than those with a low score. The different weightings can be used for adaptive noise suppression in a subsequent data analysis, for example.

Further embodiments of the invention are conceivable in addition to the embodiments explained by way of example. With knowledge of this disclosure, those skilled in the art can easily design further advantageous embodiments, which are to be covered by the scope of protection of the claims, including any equivalents as the case may be.

The invention claimed is:

1. An apparatus for the spatially resolved ion-spectrometric measurement of a two-dimensional sample, the apparatus comprising:
   an ion spectrometer that ionizes a plurality of finite areas ($A_{fin,x,y}$) of the two-dimensional sample and passes the resulting ions through a stage, in which a gas and an electric field are used to separate the ions according to their collision cross-section (σ) or a quantity derived therefrom, before the ions from each finite area reach and are measured by a mass spectrometer to provide a set of measurement signal data that represent molecular content across the two-dimensional sample at a time of measurement; and
   a computing and/or control unit configured to execute a set of instructions comprising:
   generating a plurality of measurement signal histograms based on the measurement signal data, where a measurement signal histogram is assigned, by means of two location coordinates (x, y), to a finite area ($A_{fin,x,y}$) of the two-dimensional sample, which is smaller than a total area ($A_{total}$) of the two-dimensional sample, and contains a measurement signal tuple having intensity dimension (J) or a quantity derived therefrom, mass dimension (m) or a quantity derived therefrom, and collision cross-section dimension (σ) or a quantity derived therefrom;
   specifying a first selection of ionic species and a second selection of ionic species for the two-dimensional sample, whose presence in measurement signal histograms is detectable and can be distinguished using the collision cross-section dimension ($\sigma$) or the quantity derived therefrom, wherein the first selection of ionic species comprises biomolecules such as proteins, peptides, glycans, and/or lipids in the two-dimensional sample;

determining the spatially resolved content of ionic species from the first selection and the spatially resolved content of ionic species from the second selection in measurement signal histograms of the finite areas ($A_{fin,x,y}$), and computing the various contents to form spatially resolved content scores ($G_{x,y}$); and labeling the two-dimensional sample with the spatially resolved content scores ($G_{x,y}$).

2. The apparatus according to claim 1, wherein the ion spectrometer ionizes the two-dimensional sample using one of (i) ionization by matrix-assisted laser desorption, MALDI, (ii) Secondary Ion Mass Spectrometry, SIMS, and (iii) Desorption Electro-Spray Ionization, DESI.

3. The apparatus according to claim 1, wherein the set of instructions is configured such that the first selection of ionic species comprises those of high analytical interest, and the second selection of ionic species comprises those of low analytical interest.

4. The apparatus according to claim 1, wherein the set of instructions is configured such that the second selection of ionic species comprises charged atoms or molecules and/or clusters thereof, which are generated by the method of sample preparation and/or the method of ionization.

5. The apparatus according to claim 1, wherein the set of instructions includes, after the labeling, presenting to a user an image of the two-dimensional sample in which individual finite areas ($A_{fin,x,y}$) are visibly coded with the assigned content scores ($G_{x,y}$).

6. The apparatus according to claim 1, wherein the set of instructions is configured such that predetermined value ranges of the content score are evaluated as ion-spectrometric measurement signals from outside the two-dimensional sample.

7. The method according to claim 1, wherein the set of instructions is configured such that a subsequent evaluation (i) only takes into account measurement signal histograms from finite areas ($A_{fin,x,y}$), where the content scores ($G_{x,y}$) lie in a predetermined range of values, and/or (ii) uses the content scores ($G_{x,y}$) as weighting factors.

8. The apparatus according to claim 7, wherein the set of instructions is configured such that the weighting factors are used for adaptive noise suppression in a subsequent analysis of the ion-spectrometric measurement signal data.

9. The apparatus according to claim 1, wherein the set of instructions is configured such that the first selection of ionic species is specified by summing several measurement signal histograms into an aggregated measurement signal histogram and determining an interesting portion of measurement signal tuple entries in the aggregated measurement signal histogram.

10. The apparatus according to claim 9, wherein the set of instructions is configured such that the interesting portion of the measurement signal tuple entries is used to distinguish the first selection of ionic species from the second selection in at least one dimension of the measurement signal histograms.

11. The apparatus according to claim 9, wherein the set of instructions is configured such that the interesting portion of measurement signal tuple entries is determined by means of regression analysis.

12. The apparatus according to claim 11, wherein the set of instructions is configured such that the regression analysis comprises a logarithmic regression or a logarithmic Radon transform.

13. The apparatus according to claim 11, wherein the set of instructions is configured such that the regression analysis searches for a correlation between collision cross-section ($\sigma$) and mass (m) of a molecule according to the equation $\sigma(m) \approx C\, m^k$, where C is a molecule-dependent proportionality factor and k is a molecule-dependent exponent.

14. The apparatus according to claim 9, wherein the set of instructions is configured such that the aggregated measurement signal histogram is calculated by a location-independent summation of several measurement signal histograms.

15. The apparatus according to claim 14, wherein the set of instructions is configured such that the location-independent summation takes into consideration only those measurement signal histograms where the measurement signal tuple entries of at least one dimension (i) exceed a predetermined threshold value, (ii) are below a predetermined threshold value, or (iii) are within a predetermined value range.

16. The apparatus according to claim 14, wherein the set of instructions is configured such that at least one measurement signal tuple entry of the individual measurement signal histograms is transformed before the summation such that measurement signal tuple entries of a first predetermined range are disproportionately weighted with respect to a second predetermined range.

17. The apparatus according to claim 1, wherein the set of instructions is configured such that the spatially resolved content score ($G_{x,y}$) is calculated using $$G_{x,y} = \frac{\sum_{i \in S_a} J_i}{\sum_{i \in S_a} J_i + \sum_{i \in S_b} J_i} \text{ or } G_{x,y} = \frac{\sum_{i \in S_a} J_i}{\sum_{i \in S_b} J_i},$$

where $S_a$ and $S_b$ respectively designate the quantity of those indices i for which the corresponding measurement signal tuple entries ($m_i$, $\sigma_i$) of the individual measurement signal histogram were assigned to the first and second selection of ionic species, respectively.

18. The apparatus according to claim 1, wherein the stage comprises a trapped ion mobility spectrometer cell.

19. The apparatus according to claim 1, wherein the mass spectrometer comprises a time-of-flight mass analyzer.

20. The apparatus according to claim 19, wherein the time-of-flight mass analyzer operates using orthogonal injection of ions onto a flight path.

* * * * *